L. M. OLDEN.
Seeding Machine.
No. 81,935. Patented Sept. 8, 1868.
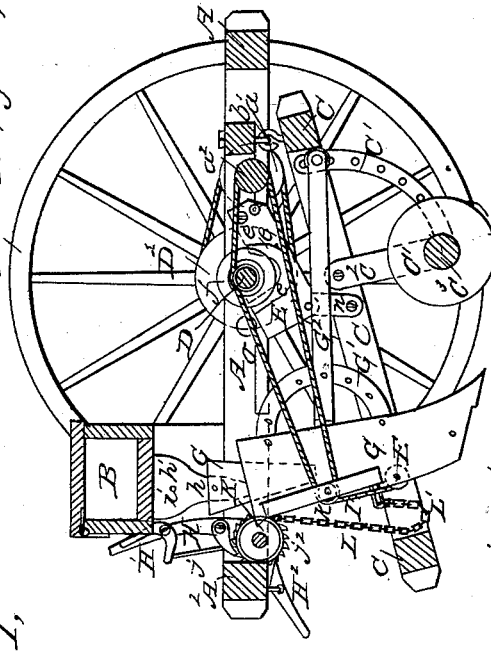
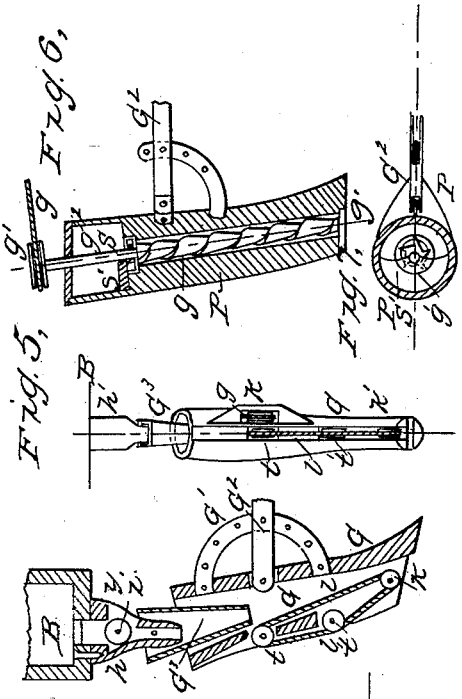
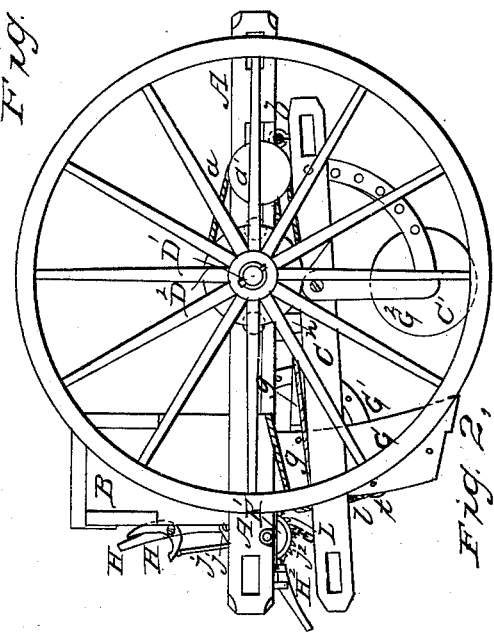
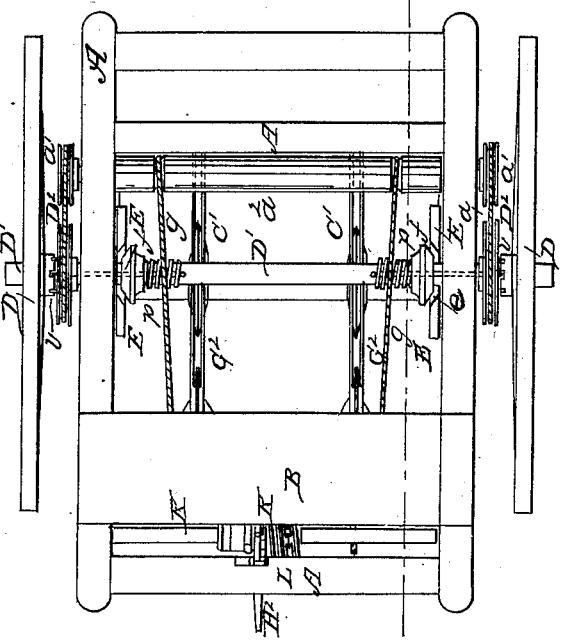
Witnesses:
Inventor.

United States Patent Office.

LUCIUS M. OLDEN, OF PANA, ILLINOIS.

Letters Patent No. 81,935, dated September 8, 1868.

IMPROVEMENT IN SEEDING-MACHINE.

*The Schedule referred to in these Letters Patent and making part of the same.*

TO ALL WHOM IT MAY CONCERN:

Be it known that I, LUCIUS M. OLDEN, of Pana, in the county of Christian, and State of Illinois, have invented certain new and useful Improvements in Seeding-Machines; and I do hereby declare that the following is a full, clear, and exact description thereof, reference being had to the accompanying drawings, making a part of this specification, in which—

Figure 1 is an elevation of one side of the improved machine.

Figure 2 is a top view of the machine.

Figure 3 is a longitudinal section through the machine, taken in the vertical plane indicated by red line $x\,x$ in fig. 2.

Figure 4 is a vertical section, taken longitudinally through one of the drill-teeth, and also through the hopper and its discharging-spouts.

Figure 5 is a view of the rear end of one of the drill-teeth.

Figures 6 and 7 are sectional views of a drill-tooth, which is slightly modified from those shown in figs. 1, 3, 4, and 5.

Similar letters of reference indicate corresponding parts in the several figures.

This invention relates to certain novel improvements on that class of seeding-machines wherein a number of drill-teeth, applied to drag-bars, are arranged beneath the frame of a carriage, and adapted for distributing seeds in several drills at one time.

The nature of my invention consists in the employment of rotary coulters in front of the drill-teeth, for cutting and clearing the way for these teeth, when said coulters are applied to a frame, which is hinged below the main carriage-frame, and which is provided with a raising-and-lowering device, and also when said coulter-frame is connected to cam-plates, that will disengage the main transporting and driving-wheels from their axle, when said coulter-frame is elevated far enough to raise the drill-teeth clear of the ground, as will be hereinafter described.

The invention also consists in providing each one of the drill-teeth with an endless feeding-device, which is applied within it, in such manner as to prevent the seed from lodging in their discharging-channel, by compelling their discharge from this channel, as will be hereinafter described.

And, in connection with this feature, the invention consists also in providing for communicating motion to the feeding-device in each one of the drill-teeth, through the medium of a shaft, which is driven from the main driving-axle, and which will cease to operate when the drill-teeth are elevated free from the ground, as will be hereinafter explained.

To enable others skilled in the art to understand my invention, I will describe its construction and operation.

In the accompanying drawings, A represents a rectangular carriage-frame, which is made of suitable capacity to have attached to it, as will be hereinafter described, the required number of drill-teeth for sowing seed in several drills at one time. This frame is mounted upon the axle $D^1$ of two transporting and driving-wheels D D, and provided with a hopper-box, B, in which latter the seed is put to be discharged.

To the forward transverse beam A', of frame A, a coulter-carrying frame, C, is connected, by means of hinges or eye-bolts, $b$, so that the rear end of this frame C will vibrate freely, and in a vertical plane. The coulters $C^1$ are circular plates, having their edges sharpened for cutting through sods and clods of earth, and thus relieving the drill-teeth from this labor. These coulters are applied upon a transverse shaft, $C^3$, at proper distances apart to work in the planes of their respective drill-teeth, and the extremities of their shaft $C^3$ are supported by means of pivoted pendants $C^2$, applied to the frame C, and provided with segments $c$, which latter will admit of the vertical adjustment of the coulters and their shaft, and allow them to be set to run at any desired height.

The rear end of this coulter-frame C extends back of the drill-teeth, and is suspended from a drum, K', upon a horizontal transverse shaft, K, which latter has its bearings in frame A. The drum K' is applied loosely upon its shaft, and provided with a ratchet-wheel, $j^2$, a lever, H, tripping-arm $H^1$, connecting-rod $j$, and pawl $j^1$, by means of which the drum can be turned around, and the chain L wound upon it. By releasing the pawl $j^1$ from the ratchet-wheel on said drum K', the chain L will be unwound from it. The dog $H^2$ engages with the ratchet-wheel $j^2$, and operates as a check to prevent the chain L unwinding from its drum when not required to do so.

The chain L, which is attached to the rear end of the coulter-frame, will sustain the rear end of this frame at any desired height which may be required. It will also allow this frame to rise and descend, and accommodate itself to the undulations of the ground over which the coulters $C^1$ roll.

The coulter-frame C is connected, by links on both sides of it, to the free ends of vibrating-cam plates E, which are pivoted to the longitudinal beams of frame A in front of the axle-tree D', as shown in figs. 2 and 3. These plates E are constructed with bevelled faces $e$, and are designed for disengaging the axle D' from the driving-wheels D, when the drill-teeth and coulters are elevated free from the ground. To effect this, there are sliding cone-shaped collars, $f$, applied upon the axle D', so as to always turn with this axle, but to have an endwise movement thereon. These collars $f$ are provided with locking-tenons $v$, and the outer ends of these tenons are caused to engage with notches made in the inner ends of the hubs of wheels D by the springs $p$, which are coiled around the axle, as shown in fig. 2.

When the frame C is depressed, as shown in fig. 3, the springs $p$ force the collars $f$, with their tenons $v$, outward, and lock the wheels D to their axle, so that the latter will turn with the wheels; but, when coulter-frame C is raised to its full height, the bevelled faces $e$ of plates E will press against the cone-faces of the collars $f$, and disengage the tenons $v$ from the wheels D, thus allowing the latter to turn loosely around their axle. By simply depressing the coulter-frame again, the collars $f$ will be released from their plates E, and the wheels D will be engaged with and caused to turn their axle.

The drill-teeth G may be made of any suitable shape, and they are applied to the rear extremities of drag-bars $G^2$, so that they can be adjusted and set to run at any desired angle or pitch with respect to these drag-bars.

One mode of adjusting these drill-teeth is shown in figs. 3 and 4, and consists in pivoting the teeth to the rear ends of their respective drag-bars, and employing perforated segments $G^1$ as a means for bracing the teeth against lateral strain, and also for attaching the drag-bars to the teeth forward of the rear pivoted fastening.

The teeth G are attached to the rear cross-beam of the coulter-frame C by means of chains L', which will allow the teeth and frame to receive independent vertical movements while passing over the ground, and will also allow all the teeth to be raised free from the ground, by elevating the frame C high enough, as above described.

Each one of the drill-teeth is constructed with a passage made lengthwise through it, through which the seed from hopper B are conducted, and delivered into the drill or channel made in the ground. The hopper communicates with the upper end of each drill-tooth G through a spout, $h'$, in which is a serrated feed-roller, $y$, which spout enters the upper end of a hinged or pivoted funnel, $G^3$.

Within each tooth G is an endless rope or chain, $l$, which is applied over the rollers $t\ t'$ and $k'$, and which is designed to compel the seed, delivered from the hopper into the tooth, to be discharged in a regular manner from the bottom of this tooth.

This rope, chain, or belt $l$ is caused to move in the direction indicated by the arrow in fig. 4, by means of a belt, $g$, which is carried over a pulley, $k$, on the shaft of the upper roller $t$, and also over a pulley-shaft, $a^2$, which is supported by the frame A in the front of the axle D'.

This pulley-shaft $a^2$ receives a rotary motion from the axle D' through the medium of grooved pulleys $a^1$, belts $a$, and grooved pulleys $D^2$, which latter are keyed upon the axle D', and only turn when the wheels D are engaged with this axle.

Instead of using endless-belt feeders $l$, as above described, a screw-feeder, $g^3$, may be employed, as shown in fig. 6, and, if desirable, each one of the drill-teeth may be constructed with a seed-hopper, S, in its upper end, with a distributer, $s$, for discharging the seed in suitable quantities from said hopper.

A tooth constructed with a hopper, S, in its end will not require the use of the hopper B and connections $h'\ G^3$. The shaft $g^2$ of the feeding-screw $g^3$ may be driven from the pulley $a^2$ by passing the endless belt $g$ around the pulley $g^1$, upon the upper end of said shaft $g^2$, as shown in fig. 6.

Having described my invention, what I claim as new, and desire to secure by Letters Patent, is—

1. The application, to the seed-passage of a drill-tooth, of a feeding-device, $l$, or its equivalent, substantially as described.

2. The combination of feed-wheel $y$, hinged funnel $G^3$, and a drill-tooth, which is constructed with a feeding-device, $l$, or their respective equivalents, substantially as described.

3. The vibrating frame C, carrying coulters $C^1$, and suspended by means of a lifting-chain L, in combination with drill-teeth, which are suspended from said frame C, by means of chains L', substantially as and for the purposes described.

4. The devices, substantially as described, for disengaging wheels D from their axle D', when frame C is lifted, in combination with drill-teeth which have feeding-devices applied within them, substantially as described.

LUCIUS M. OLDEN.

Witnesses:
 FRED'K SCHNEITER,
 WM. CORCORAN.